(12) United States Patent
Jung et al.

(10) Patent No.: US 12,199,273 B2
(45) Date of Patent: Jan. 14, 2025

(54) NEGATIVE ELECTRODE AND METHOD FOR MANUFACTURING THE SAME

(71) Applicant: LG Energy Solution, Ltd., Seoul (KR)

(72) Inventors: Dong-Sub Jung, Daejeon (KR); Suk-In Noh, Daejeon (KR); Chang-Ju Lee, Daejeon (KR); Sang-Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/030,976

(22) PCT Filed: Oct. 15, 2021

(86) PCT No.: PCT/KR2021/014423
§ 371 (c)(1),
(2) Date: Apr. 7, 2023

(87) PCT Pub. No.: WO2022/080979
PCT Pub. Date: Apr. 21, 2022

(65) Prior Publication Data
US 2024/0372077 A1    Nov. 7, 2024

(30) Foreign Application Priority Data
Oct. 16, 2020  (KR) .................. 10-2020-0134666

(51) Int. Cl.
  H01M 4/36      (2006.01)
  H01M 4/04      (2006.01)
  H01M 4/133     (2010.01)
  H01M 4/1393    (2010.01)
  H01M 4/587     (2010.01)
  H01M 4/62      (2006.01)
  H01M 4/02      (2006.01)

(52) U.S. Cl.
  CPC ......... *H01M 4/366* (2013.01); *H01M 4/0404* (2013.01); *H01M 4/133* (2013.01); *H01M 4/1393* (2013.01); *H01M 4/587* (2013.01); *H01M 4/622* (2013.01); *H01M 2004/027* (2013.01)

(58) Field of Classification Search
None
See application file for complete search history.

(56) References Cited

U.S. PATENT DOCUMENTS

| | | |
|---|---|---|
| 2014/0287316 A1 | 9/2014 | Ahn et al. |
| 2018/0190985 A1 | 7/2018 | Choi et al. |
| 2019/0027740 A1 | 1/2019 | Lee et al. |
| 2019/0198857 A1 | 6/2019 | Oh et al. |
| 2020/0119336 A1 | 4/2020 | Shinomiya |
| 2020/0185768 A1 | 6/2020 | Kang et al. |
| 2020/0235383 A1 | 7/2020 | Shin et al. |
| 2021/0111399 A1* | 4/2021 | Ma ................... H01M 4/133 |
| 2021/0111410 A1 | 4/2021 | Huang et al. |
| 2021/0167398 A1* | 6/2021 | Choi ............... H01M 4/366 |
| 2023/0361270 A1 | 11/2023 | Noh ................. H01M 4/36 |
| 2023/0378432 A1* | 11/2023 | Wang ............... H01M 4/366 |

FOREIGN PATENT DOCUMENTS

| | | |
|---|---|---|
| JP | H11-126600 A | 5/1999 |
| JP | 2011-192539 A | 9/2011 |
| JP | 2013-149403 A | 8/2013 |
| JP | 2015-511389 A | 4/2015 |
| JP | WO2018/225515 A1 | 12/2018 |
| KR | 10-2014-0080837 A | 7/2014 |
| KR | 10-2014-0095980 A | 8/2014 |
| KR | 10-2017-0031375 A | 3/2017 |
| KR | 10-2017-0075661 A | 7/2017 |
| KR | 10-2018-0040268 A | 4/2018 |
| KR | 10-1875031 B1 | 7/2018 |
| KR | 10-2019-0029320 A | 3/2019 |
| KR | 10-2019-0065148 A | 6/2019 |
| KR | 10-2019-0090497 A | 8/2019 |

(Continued)

OTHER PUBLICATIONS

International Search Report and Written Opinion issued in corresponding International Patent Application No. PCT/KR2021/014423, dated Jan. 24, 2022.

Office Action issued in corresponding Japanese Patent Application No. 2023-523167, dated May 13, 2024. (Note: JP WO2018-225515 A1 and KR 10-2020-0073801 A were previously cited).

Office Action issued in corresponding Korean Patent Application No. 10-2021-0137932, dated Jan. 4, 2024. (Note: WO 2018/225515 A1 was previously cited).

*Primary Examiner* — Tracy M Dove
(74) *Attorney, Agent, or Firm* — Morgan, Lewis & Bockius LLP

(57) ABSTRACT

Disclosed is a negative electrode, including: a negative electrode current collector; and a negative electrode active material layer disposed on at least one surface of the negative electrode current collector, and having a lower layer region containing a first active material and a first binder polymer, and an upper layer region disposed on the lower layer region and containing a second active material and a second binder polymer, wherein the first active material includes primary particles of artificial graphite, the second active material includes secondary particles of artificial graphite and a carbon coating layer disposed on the secondary particles, and the weight percentage (wt %) of the first binder polymer in the lower layer region is larger than the weight percentage (wt %) of the second binder polymer in the upper layer region. Also disclosed are a method for manufacturing the negative electrode and a lithium secondary battery including the negative electrode.

13 Claims, No Drawings

(56) References Cited

FOREIGN PATENT DOCUMENTS

| KR | 10-2053063 B1 | 12/2019 |
| KR | 10-2020-0069215 A | 6/2020 |
| KR | 10-2020-0073801 A | 6/2020 |
| WO | 2020-042571 A1 | 3/2020 |

* cited by examiner

NEGATIVE ELECTRODE AND METHOD FOR MANUFACTURING THE SAME

TECHNICAL FIELD

The present disclosure relates to a negative electrode providing improved quick charging performance, while ensuring adhesion, and a method for manufacturing the same. The present application claims priority to Korean Patent Application No. 10-2020-0134666 filed on Oct. 16, 2020 in the Republic of Korea, the disclosures of which are incorporated herein by reference.

BACKGROUND ART

As technical development and needs for mobile instruments have been increased, secondary batteries that is rechargeable and can be downsized and provided with high capacity have been increasingly in demand. In addition, among such secondary batteries, lithium secondary batteries having high energy density and operating voltage have been commercialized and used widely.

A lithium secondary battery has a structure including: an electrode assembly having a positive electrode and a negative electrode, each of which includes an active material coated on an electrode current collector, and a porous separator interposed between both electrodes; and a lithium salt-containing electrolyte injected to the electrode assembly. The electrode is obtained by applying slurry including an active material, a binder and a conductive material dispersed in a solvent to a current collector, followed by drying and pressing.

In general, a secondary battery includes a positive electrode, a negative electrode, an electrolyte and a separator. The negative electrode includes a negative electrode active material capable of lithium-ion intercalation/deintercalation. For example, a graphite-based active material, such as natural graphite or artificial graphite, may be used as a negative electrode active material.

Artificial graphite is used frequently in the form of secondary particles. For this purpose, in general, cokes as a material of primary particles are granulated to form secondary particles, and then graphitization is carried out through heat treatment to provide artificial graphite in the form of secondary particles.

However, when using such a conventional process in which the size of primary particles is not controlled, non-granulated micropowder or micropowder separated from the secondary particles after the granulation is generated in a large amount. Therefore, the resultant negative electrode shows reduced negative electrode adhesion (resistance against detachment of the negative active material particles from the negative electrode), and the battery may provide poor high-temperature storage performance. In addition, since the secondary particles include micropowder, the negative electrode has non-uniform pores and shows increased resistance in the pores, resulting in degradation of the quick charging performance of a battery.

According to the related art, there has been used a process for forming a carbon coating layer on the secondary particles in order to solve the above-mentioned problems. However, use of such a carbon coating layer alone, it is difficult to inhibit detachment of the micropowder, and thus it is not possible to obtain a sufficient effect. In addition, even when the detachment is inhibited, the micropowder present in the secondary particles cannot be removed, thereby making it difficult to improve the quick charging performance of a battery. Further, the content of pitch used for a granulation process or the content of a carbon precursor required for forming a carbon coating layer should be increased to solve the problems caused by an excessive amount of micropowder, and thus the resultant negative electrode shows a decrease in capacity per weight.

Meanwhile, in the case of commercially available batteries, each of the negative electrode and the positive electrode is formed by coating each electrode slurry on each electrode current collector once. In this case, when the binder distribution in the section of the electrode layer is determined, the binder content is high in the vicinity of the surface but is reduced toward the current collector.

The electrode shows reduced adhesion due to a decrease in binder content in the vicinity of the current collector. Thus, when the binder content is increased to improve the problem of degradation of adhesion, the negative electrode shows increased resistance, resulting in the problem of degradation quick charging performance.

Under these circumstances, there is a need for a novel attempt to improve adhesion between the active material layer and the current collector, while providing a battery with improved quick charging performance.

DISCLOSURE

Technical Problem

The present disclosure is designed to solve the problems of the related art, and therefore the present disclosure is directed to providing a negative electrode providing improved quick charging performance, while ensuring adhesion, and a method for manufacturing the negative electrode.

The present disclosure is also directed to providing a lithium secondary battery including the negative electrode.

Technical Solution

In one aspect of the present disclosure, there is provided a method for manufacturing a negative electrode according to any one of the following embodiments.

According to the first embodiment of the present disclosure, there is provided a negative electrode, including:
a negative electrode current collector; and
a negative electrode active material layer disposed on at least one surface of the negative electrode current collector, and having a lower layer region containing a first active material and a first binder polymer, and an upper layer region disposed on the lower layer region and containing a second active material and a second binder polymer,
wherein the first active material includes primary particles of artificial graphite, the second active material includes secondary particles of artificial graphite and a carbon coating layer disposed on the secondary particles, and
the weight percentage (wt %) of the first binder polymer in the lower layer region is larger than the weight percentage (wt %) of the second binder polymer in the upper layer region.

According to the second embodiment, there is provided the negative electrode as defined in the first embodiment, wherein the first active material has a D50 of 3-20 μm.

According to the third embodiment, there is provided the negative electrode as defined in the first or the second embodiment, wherein the second active material has a D50 of 5-35 μm.

According to the fourth embodiment, there is provided the negative electrode as defined in any one of the first to the third embodiments, wherein the secondary particles of artificial graphite are formed by granulation of the primary particles of artificial graphite.

According to the fifth embodiment, there is provided the negative electrode as defined in any one of the first to the fourth embodiments, wherein the carbon coating layer of the second active material is present in an amount of 0.5-10.0 wt % based on the total weight of the second active material.

According to the sixth embodiment, there is provided the negative electrode as defined in any one of the first to the fifth embodiments, wherein the ratio of the weight percentage (wt %) of the first binder polymer in the lower layer region to the weight percentage (wt %) of the second binder polymer in the upper layer region is 1.1:1-5:1.

According to the seventh embodiment, there is provided the negative electrode as defined in any one of the first to the sixth embodiments, wherein the weight percentage (wt %) of the first binder polymer in the lower layer region of the negative electrode active material layer is 2-4 wt %, and the weight percentage (wt %) of the second binder polymer in the upper layer region of the negative electrode active material layer is 0.5-2 wt %.

According to the eighth embodiment, there is provided the negative electrode as defined in any one of the first to the seventh embodiments, wherein the ratio (wt %) of the combined weight of the first binder polymer and the second binder polymer based on the total weight of the negative electrode active material layer is 1-3 wt %.

According to the ninth embodiment, there is provided a method for manufacturing a negative electrode, including the steps of:
preparing slurry for a lower layer containing a first active material, a first binder polymer and a first dispersion medium, and slurry for an upper layer containing a second active material, a second binder polymer and a second dispersion medium;
coating the slurry for a lower layer on one surface of a negative electrode current collector, and coating the slurry for an upper layer on the slurry for a lower layer; and
drying the coated slurry for a lower layer and slurry for an upper layer at the same time to form a negative electrode active material layer,
wherein the first active material includes primary particles of artificial graphite, the second active material includes secondary particles of artificial graphite and a carbon coating layer disposed on the secondary particles, and
the weight percentage (wt %) of the first binder polymer in the solid content of the slurry for a lower layer is larger than the weight percentage (wt %) of the second binder polymer in the solid content of the slurry for an upper layer.

According to the tenth embodiment, there is provided the method for manufacturing a negative electrode as defined in the ninth embodiment, wherein the ratio of the weight percentage (wt %) of the first binder polymer in the solid content of the slurry for a lower layer to the weight percentage (wt %) of the second binder polymer in the solid content of the slurry for an upper layer is 1.1:1-5:1.

According to the eleventh embodiment, there is provided the method for manufacturing a negative electrode as defined in the ninth or the tenth embodiment, wherein the weight percentage (wt %) of the first binder polymer in the solid content of the slurry for a lower layer is 2-4 wt %, and the weight percentage (wt %) of the second binder polymer in the solid content of the slurry for an upper layer is 0.5-2 wt %.

According to the twelfth embodiment, there is provided the method for manufacturing a negative electrode as defined in any one of the ninth to the eleventh embodiments, wherein the ratio (wt %) of the combined weight of the first binder polymer and the second binder polymer based on the total solid content of the slurry for a lower layer and the slurry for an upper layer is 1-3 wt %.

According to the thirteenth embodiment, there is provided a lithium secondary battery including the negative electrode as defined in any one of the first to the eighth embodiments.

Advantageous Effects

According to an embodiment of the present disclosure, it is possible to provide a negative electrode which can provide enhanced binding force between the negative electrode active material layer and the current collector, while not increasing the content of a binder significantly, prevents detachment of the active material, and shows improved resistance characteristics.

In addition, when using the same total content of binders, adhesion can be improved by increasing the proportion of a binder in the lower layer, quick charging performance can be improved by reducing the proportion of a binder in the upper layer, adhesion can be further enhanced by using primary particles of artificial graphite in the lower layer, and quick charging performance can be further improved by using secondary particles of artificial graphite provided with a carbon coating layer in the upper layer.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a negative electrode, including:
a negative electrode current collector; and
a negative electrode active material layer disposed on at least one surface of the negative electrode current collector, and having a lower layer region containing a first active material and a first binder polymer, and an upper layer region disposed on the lower layer region and containing a second active material and a second binder polymer,
wherein the first active material includes primary particles of artificial graphite, the second active material includes secondary particles of artificial graphite and a carbon coating layer disposed on the secondary particles, and
the weight percentage (wt %) of the first binder polymer in the lower layer region is larger than the weight percentage (wt %) of the second binder polymer in the upper layer region.

According to the present disclosure, different types of active materials are used in the lower region and the upper region, and particularly, primary particles of artificial graphite (first active material) is used in the lower layer region of the negative electrode active material layer, and an active material (second active material) including secondary particles of artificial graphite and a carbon coating layer disposed on the secondary particles is used in the upper layer region of the negative electrode active material layer.

In the case of secondary particles, a binder polymer may be distributed in the voids among the primary particles forming the secondary particles, and thus the number of binder polymer capable of realizing adhesion actually is reduced. However, primary particles have no such voids, and thus all of the binder polymer introduced to the negative electrode active material layer can contribute to adhesion. Therefore, when the primary particles of artificial graphite is incorporated to the lower layer region of the negative electrode active material layer facing the current collector directly, it is possible to improve the adhesion between the current collector and the negative electrode active material layer significantly.

The upper layer region of the negative electrode active material layer includes the active material (second active material), including secondary particles of artificial graphite formed by granulation of the primary particles of artificial graphite and a carbon coating layer disposed on the secondary particles. In the case of the secondary particles, they show a low degree of orientation [(I(004)/I(110)] to improve quick charging performance. Herein, in general, artificial graphite may be prepared through a graphitization process including sintering raw materials, such as coal tar, coal tar pitch and petroleum-based heavy oil, at a temperature of 2,500° C. or higher. After such graphitization, the resultant product is subjected to particle size adjustment, such as pulverization and secondary particle formation, so that it may be used as a negative electrode active material. Artificial graphite includes crystals distributed randomly in particles, has a lower sphericity as compared to natural graphite and a slightly sharp shape.

The artificial graphite used according to an embodiment of the present disclosure includes commercially available mesophase carbon microbeads (MCMB), mesophase pitch-based carbon fibers (MPCF), block-like graphitized artificial graphite, powder-like graphitized artificial graphite, or the like, and may be artificial graphite having a sphericity of 0.91 or less, preferably 0.6-0.91, and more preferably 0.7-0.9.

As used herein, 'D50' as mentioned hereinafter means a particle diameter corresponding to 50% of the accumulated particle number distribution depending on particle diameter, and may also be referred as an average particle diameter. In other words, 'particle diameter Dn' means a particle diameter corresponding to n % of the accumulated particle number distribution depending on particle diameter. Therefore, 'D90' means a particle diameter corresponding to 90% of the accumulated particle number distribution depending on particle diameter, and 'D10' means a particle diameter corresponding to 10% of the accumulated particle number distribution depending on particle diameter.

In addition, Dn, including D50, may be determined by using a laser diffraction method. Particularly, powder to be analyzed is dispersed in a dispersion medium and introduced to a commercially available laser diffraction particle size analyzer (e.g. Microtrac S3500), and then a difference in diffraction pattern depending on particle size is determined, when particles pass through laser beams, and then particle size distribution is calculated. Then, the particle diameter at each point of 10%, 50% and 90% of the accumulated particle number distribution depending on particle diameter is calculated to determine each of D10, D50 and D90.

In the particle size distribution, the first active material, i.e. artificial graphite (primary particles) may have a D50 of 3-20 μm, particularly 5-15 μm, and more particularly 7-13 μm. When the primary particles satisfy the above-defined range of D50, the primary particles may be formed with a high graphitization degree, and the negative electrode active material particles ensure a suitable orientation index to improve quick charging performance.

The secondary particles in the second active material may be formed by granulation of the primary particles. In other words, the secondary particles may be structures formed by aggregation of the primary particles through a granulation process.

The second active material includes a carbon coating layer on the surfaces of the secondary particles, wherein the carbon coating layer may include at least one of amorphous carbon and crystalline carbon.

The crystalline carbon may further improve the conductivity of the negative electrode active material. The crystalline carbon may include at least one selected from the group consisting of fullerene, carbon nanotubes and graphene.

The amorphous carbon allows the coating layer to maintain suitable strength to improve the output characteristics and quick charging performance of artificial graphite. The amorphous carbon may be at least one carbide selected from the group consisting of tar, pitch and other organic materials, or a carbonaceous material formed by using hydrocarbon as a source for a chemical vapor deposition process.

The carbides of other organic materials may include a carbide of organic material selected from carbides of sucrose, glucose, galactose, fructose, lactone, mannose, ribose, aldohexose and ketohexose, and a combination thereof.

The hydrocarbon may be a substituted or non-substituted aliphatic or alicyclic hydrocarbon, or substituted or non-substituted aromatic hydrocarbon. The aliphatic or alicyclic hydrocarbon in the substituted or non-substituted aliphatic or alicyclic hydrocarbon may include methane, ethane, ethylene, acetylene, propane, butane, butene, pentane, isobutane, hexane, or the like. The aromatic hydrocarbon in the substituted or non-substituted aromatic hydrocarbon may include benzene, toluene, xylene, styrene, ethylbenzene, diphenylmethane, naphthalene, phenol, cresol, nitrobenzene, chlorobenzene, indene, cumarone, pyridine, anthracene, phenanthrene, or the like.

The carbon coating layer may be present in an amount of 0.5-10.0 wt %, particularly 1-8 wt %, or 2-6 wt %, based on the total weight of the second active material. When the above-defined range is satisfied, it is possible to improve quick charging performance of artificial graphite, while ensuring capacity per weight of the negative electrode active material particles.

The second active material may have a D50 of 5-35 μm, particularly 7-33 μm, and more particularly 10-30 μm. When the above-defined range is satisfied, the second active material may be dispersed homogeneously in slurry for an upper layer, while providing a battery with improved charging performance.

In the negative electrode according to the present disclosure, since the first active material contained in the lower layer region and the second active material contained in the upper layer region are different from each other in terms of average particle diameter and shape, an intermixing region in which such different types of active materials are mixed may be present at the portion where the lower layer region is in contact with the upper layer region. This is because when the slurry for a lower layer containing the first active material and the slurry for an upper layer containing the second active material are coated at the same time or continuously with a very short time interval, and then dried at the same time to form a negative electrode active material layer, a certain intermixing zone is generated at the interface where the slurry for a lower layer is in contact with the slurry for an upper layer before drying, and then the mixing zone is formed in the shape of a layer of intermixing region, while the slurry for a lower layer and the slurry for an upper layer are dried subsequently.

According to an embodiment of the present disclosure, the weight ratio (ratio of the loading amount per unit area) of the lower layer region to the upper layer region of the negative electrode active material layer may be 20:80-80:20, particularly 30:70-70:30. When the above-defined weight ratio is satisfied, it is possible to obtain high adhesion and to realize excellent quick charging performance.

According to an embodiment of the present disclosure, the thickness ratio of the upper layer region to the lower layer region may be 20:80-80:20, particularly 30:70-70:30. When the above-defined thickness ratio is satisfied, it is possible to obtain high adhesion and to realize excellent quick charging performance.

According to an embodiment of the present disclosure, the total thickness of the negative electrode active material layer is not particularly limited. For example, the negative electrode active material layer may have a total thickness of 40-200 μm. In addition, in the negative electrode active material layer, the lower layer region may have a thickness of 20-150 μm, or 30-100 μm, and the upper layer region may have a thickness of 20-150 μm, or 30-100 μm.

Herein, when the thickness of the upper layer region and that of the lower layer region satisfy the above-defined ranges, it is possible to obtain high adhesion and to realize excellent quick charging performance.

The weight percentage (wt %) of the first binder polymer in the lower layer region is larger than the weight percentage (wt %) of the second binder polymer in the upper layer region.

Particularly, the ratio of the weight percentage (wt %) of the first binder polymer in the lower layer region to the weight percentage (wt %) of the second binder polymer in the upper layer region may be 1.1:1-5:1, 1.2:1-4:1, 1.5:1-3:1, 2.1:1-3:1, 2.3:1.7-3:1, 2.7:1.3-3:1, or 2.3:1.7-2.7:1.3.

Herein, when the ratio of the weight percentage (wt %) of the first binder polymer in the lower layer region to the weight percentage (wt %) of the second binder polymer in the upper layer region satisfies the above-defined range, it is possible to realize high adhesion and excellent quick charging performance.

According to an embodiment of the present disclosure, the weight percentage (wt %) of the first binder polymer in the lower layer region of the negative electrode active material layer may be 2-4 wt %, or 2.3-3 wt %, and the weight percentage (wt %) of the second binder polymer in the upper layer region of the negative electrode active material layer may be 0.5-2 wt %, or 1-1.7 wt %.

According to an embodiment of the present disclosure, the ratio (wt %) of the combined weight of the first binder polymer and the second binder polymer based on the total weight of the negative electrode active material layer may be 1-3 wt %, 1-2 wt %, or 2-3 wt %.

The weight percentage (wt %) of the first binder polymer in the lower layer region and the weight percentage (wt %) of the second binder polymer in the upper layer region of the negative electrode according to an embodiment of the present disclosure may be calculated from the weight percentage (%) of each binder based on the total weight of the solid content (active material, conductive material, binder, thickener) contained initially in the slurry for a lower layer and the slurry for an upper layer for forming the lower layer and the upper layer of the negative electrode.

In addition, the weight percentage (wt %) of the first binder polymer in the lower layer region and the weight percentage (wt %) of the second binder polymer in the upper layer region of the negative electrode active material layer of the negative electrode according to an embodiment of the present disclosure may be determined indirectly by coloring each binder polymer with a metal oxide capable of coloring the binder polymer, and measuring the content of the colored metal by using energy dispersive X-ray spectroscopy. The metal oxide that may be used herein include osmium tetroxide ($OsO_4$), ruthenium tetroxide ($RuO_4$), or the like.

According to an embodiment of the present disclosure, after cutting the section of the negative electrode active material layer, the first binder polymer and the second binder polymer contained in the lower layer region and the upper layer region of the negative electrode active material layer, respectively, are colored by using osmium tetroxide ($OsO_4$), and then the atomic ratio of osmium in the section of the colored negative electrode active material layer may be determined. The determined osmium atomic ratio value of the surface of the electrode active material layer has a correlation with the content of osmium tetroxide ($OsO_4$) and the binder polymer in the section of the colored negative electrode active material layer. Therefore, the content of the binder polymer can be calculated therefrom.

Particularly, a finished negative electrode is prepared with a predetermined size and cut in the vertical direction of the negative electrode. Then, the sample having an exposed section of the negative electrode active material layer is introduced to a container including osmium tetroxide ($OsO_4$) and stored in the container for 1-5 hours after sealing. After that, the negative electrode is removed from the container and introduced to a vacuum oven so that it may be dried for 24-72 hours, thereby coloring the binder polymer contained in the negative electrode active material layer with $OsO_4$. After the completion of the coloring, the negative electrode may be analyzed in terms of the content of the binder polymer in the section by using energy dispersive X-ray spectroscopy.

For example, the negative electrode according to an embodiment of the present disclosure is prepared with a size of 1 cm×1 cm and introduced to a container including osmium tetroxide ($OsO_4$), followed by sealing. After 3 hours, the negative electrode is removed from the container and introduced to a vacuum oven so that it may be dried for 48 hours. In this manner, the binder polymer contained in the negative electrode active material layer is colored. After the completion of the coloring, the negative electrode is analyzed in terms of the content of the binder polymer of the surface by using energy dispersive X-ray spectroscopy. For example, X-Max80 and Extreme detector (available from Oxford Co.) may be used to determine the atomic ratio of osmium of the surface of the negative electrode active material layer under the following conditions.

TABLE 1

| Item | Condition |
| --- | --- |
| Secondary Electron Microscopy System | JEOL JSM-7200F |

TABLE 1-continued

| Item | Condition |
| --- | --- |
| Acceleration voltage (kV) | 5 |
| Magnification (X) | 1000 |
| Dwell Time (µs) | 100 |

According to an embodiment of the present disclosure, the negative electrode current collector used as a substrate for forming the negative electrode active material layer is not particularly limited, as long as it has conductivity, while not causing any chemical change in the corresponding battery. For example, copper, stainless steel, aluminum, nickel, titanium, baked carbon, copper or stainless steel surface-treated with carbon, nickel, titanium, silver, etc., aluminum-cadmium alloy, or the like, may be used.

Although the current collector is not particularly limited in its thickness, it may have a currently used thickness of 3-500 µm.

Particular examples of each of the first binder polymer and the second binder polymer may include various types of binder polymers, such as polyvinylidene fluoride-co-hexafluoropropylene (PVDF-co-HFP), polyvinylidene fluoride, polyacrylonitrile, polymethyl methacrylate, polytetrafluoroethylene, polyethylene, polypropylene, styrene butadiene rubber (SBR), fluoro-rubber, various copolymers, or the like.

In addition, according to an embodiment of the present disclosure, the negative electrode active material layer may further include a thickener which contributes to dispersion stability of slurry. Particular examples of each of the first thickener contained in the lower layer region and the second thickener container in the upper layer region may include carboxymethyl cellulose (CMC), carboxyethyl cellulose, polyvinyl pyrrolidone, polyvinyl alcohol, starch, hydroxypropyl cellulose, regenerated cellulose, polyvinyl pyrrolidone, polyacrylic acid, or the like.

The negative electrode active material layer may optionally further include a conductive material. The conductive material is not particularly limited, as long as it causes no chemical change in the corresponding battery and has conductivity. Particular examples of the conductive material include: carbon black, such as carbon black, acetylene black, Ketjen black, channel black, furnace black, lamp black or thermal black; conductive fibers, such as carbon fibers or metallic fibers; fluorocarbon; metal powder, such as aluminum or nickel powder; conductive whisker, such as zinc oxide or potassium titanate; conductive metal oxide, such as titanium oxide; conductive materials, such as polyphenylene derivatives, or the like.

In another aspect of the present disclosure, there is provided a method for manufacturing a negative electrode, including the steps of:
 preparing slurry for a lower layer containing a first active material, a first binder polymer and a first dispersion medium, and slurry for an upper layer containing a second active material, a second binder polymer and a second dispersion medium;
 coating the slurry for a lower layer on one surface of a negative electrode current collector, and coating the slurry for an upper layer on the slurry for a lower layer; and
 drying the coated slurry for a lower layer and slurry for an upper layer at the same time to form a negative electrode active material layer,
 wherein the first active material includes primary particles of artificial graphite, the second active material includes secondary particles of artificial graphite and a carbon coating layer disposed on the secondary particles, and
 the weight percentage (wt %) of the first binder polymer in the solid content of the slurry for a lower layer is larger than the weight percentage (wt %) of the second binder polymer in the solid content of the slurry for an upper layer.

Reference will be made to the above description about the active materials (the first active material and the second active material), binder polymers (the first binder polymer and the second binder polymer), optionally used thickeners (the first thickener and the second thickener), conductive materials, or the like, contained in the slurry for a lower layer and the slurry for an upper layer.

The dispersion medium, i.e. each of the first dispersion medium and the second dispersion medium may independently include N-methyl pyrrolidone, acetone, water, or the like.

Herein, the lower layer region of the negative electrode active material layer according to the present disclosure is formed from the coated slurry for a lower layer, and the upper layer region of the negative electrode active material layer according to the present disclosure is formed from the coated slurry for an upper layer.

According to an embodiment of the present disclosure, the slurry for a lower layer is coated, and the slurry for an upper layer may be coated on the slurry for a lower layer simultaneously or with a predetermined time interval. Herein, a coating device, such as a double slot die, may be used.

The step of drying the slurry for a lower layer and the slurry for an upper layer at the same time to form a negative electrode active material layer may include a step of drying the coated slurry for a lower layer and slurry for an upper layer at the same time to remove the dispersion medium in each slurry, and carrying out pressing and vacuum drying to form a negative electrode active material layer.

Herein, the pressing may be carried out by using a method, such as roll pressing, used conventionally in the art. For example, the pressing may be carried out under a pressure of 1-20 MPa at a temperature of 15-30° C. In addition, the pressing may be carried out under such a condition that the electrode (active material layer) may have a porosity of 20-40%, 25-35%, 20-30%, or 30-40% after pressing.

The step of drying the coated slurry may be carried out at 70-90° C., 75-85° C., or 80-85° C., for 10-30 minutes, 15-25 minutes, or 20-30 minutes. However, the drying temperature and time may be controlled suitably depending on the type and content of the dispersion medium.

In addition, after pressing the dried slurry layer, vacuum drying may be carried out at 100-170° C., 120-150° C., or 130-150° C., for about 3-10 hours, or 5-8 hours. However, the vacuum drying temperature and time may be controlled suitably depending on the type and content of the dispersion medium.

The ratio of the weight percentage (wt %) of the first binder polymer in the solid content of the slurry for a lower layer to the weight percentage (wt %) of the second binder polymer in the solid content of the slurry for an upper layer may be 1.1:1-5:1, 1.2:1-4:1, 1.5:1-3:1, 2.1:1-3:1, 2.3:1.7-3:1, 2.7:1.3-3:1, or 2.3:1.7-2.7:1.3.

Herein, when the ratio of the weight percentage (wt %) of the first binder polymer in the coated slurry for a lower layer to the weight percentage (wt %) of the second binder polymer in the coated slurry for an upper layer satisfies the above-defined range, it is possible to realize high adhesion and excellent quick charging performance.

The weight percentage (wt %) of the first binder polymer in the solid content of the slurry for a lower layer may be 2-4 wt %, or 2.3-3 wt %, and the weight percentage (wt %) of the second binder polymer in solid content of the slurry for an upper layer may be 0.5-2 wt %, or 1-1.7 wt %.

The ratio (wt %) of the combined weight of the first binder polymer and the second binder polymer in the total solid content of the slurry for a lower layer and the slurry for an upper layer may be 1-3 wt %, 1-2 wt %, or 2-3 wt %.

In still another aspect of the present disclosure, there is provided a lithium secondary battery including the negative electrode obtained as described above. Particularly, the lithium secondary battery may be obtained by injecting a lithium salt-containing electrolyte to an electrode assembly including a positive electrode, the negative electrode as described above and a separator interposed between both electrodes.

The positive electrode may be obtained by mixing a positive electrode active material, a conductive material, a binder and a solvent to form slurry, and coating the slurry directly onto a metal current collector, or casting the slurry onto a separate support, peeling a positive electrode active material film from the support and laminating the film on a metal current collector.

The positive electrode active material used in the positive electrode active material layer may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x < 0.5$, $0 \leq y < 0.5$, $0 \leq z < 0.5$, and $0 < x+y+z \leq 1$), or a mixture of at least two of them.

Meanwhile, the same conductive material, binder and solvent as used for manufacturing the negative electrode may be used.

The separator may be a conventional porous polymer film used conventionally as a separator. For example, the porous polymer film may be a porous polymer film made of a polyolefinic polymer, such as ethylene homopolymer, propylene homopolymer, ethylene/butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2^-$, $(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, and tetrahydrofuran.

Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonate is used after mixing it with a linear carbonate having low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, a cylindrical battery casing or a prismatic battery casing, and then injecting the electrolyte thereto. In a variant, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or cable type battery.

The lithium secondary battery according to the present disclosure may be used for a battery cell used as a power source for a compact device, and may be used preferably as a unit battery for a medium- or large-size battery module including a plurality of battery cells. Particular examples of medium- or large-size devices include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1: Manufacture of Negative Electrode

<Preparation of Negative Electrode Slurry for Lower Layer>

Primary particles of artificial graphite having an average particle diameter (D50) of 10 μm were used as a first active material.

The first active material, Super C65 as a conductive material, styrene butadiene rubber (SBR) as a first binder polymer and carboxymethyl cellulose (CMC) as a thickener were mixed at a weight ratio of 95:1:3:1, and water was added thereto to prepare slurry for a lower layer.

<Preparation of Negative Electrode Slurry for Upper Layer>

A second active material including secondary particles of artificial graphite formed by granulation of primary particles of artificial graphite and a carbon coating layer disposed on the artificial graphite was prepared. Herein, in the second active material, the primary particles had an average particle diameter (D50) of 10 μm, and the secondary particles formed by granulation of the primary particles had an average particle diameter (D50) of 20 μm. The carbon coating layer was present on the secondary particles in an amount of 4.0 wt % based on the total weight of the second active material. Herein, the secondary particles having the carbon coating layer thereon had an average particle diameter (D50) of 21 μm.

The second active material, Super C65 as a conductive material, styrene butadiene rubber (SBR) as a second binder polymer and carboxymethyl cellulose (CMC) as a thickener were mixed at a weight ratio of 97:1:1:1, and water was added thereto to prepare slurry for an upper layer.

<Manufacture of Negative Electrode>

The slurry for a lower layer was applied to one surface of copper (Cu) foil as a negative electrode current collector having a thickness of 10 μm at a loading amount of 2.5 mAh/cm$^2$, and the slurry for an upper layer was coated on the coated slurry for a lower layer at a loading amount of 2.5 mAh/cm$^2$, by using a double slot die. After coating each slurry, the slurry was dried at 80° C. for 20 minutes to remove water in the slurry, the dried slurry layer is pressed, and then vacuum drying was carried out at about 130° C. for 8 hours to obtain a negative electrode. Herein, the resultant negative electrode had a porosity of 30%. The obtained negative electrode had a dual layer structure including an upper layer region having a thickness of 50 μm and a lower layer having a thickness of 50 μm, and was provided with a negative electrode active material layer having a total thickness of 100 μm.

Example 2: Manufacture of Negative Electrode

A negative electrode was obtained in the same manner as Example 1, except that the first active material, Super C65 as a conductive material, styrene butadiene rubber (SBR) as a first binder polymer and carboxymethyl cellulose (CMC) as a thickener were mixed at a weight ratio of 95.3:1:2.7:1, and water was added thereto to prepare slurry for a lower layer, and the second active material, Super C65 as a conductive material, styrene butadiene rubber (SBR) as a second binder polymer and carboxymethyl cellulose (CMC) as a thickener were mixed at a weight ratio of 96.7:1:1.3:1, and water was added thereto to prepare slurry for an upper layer.

Example 3: Manufacture of Negative Electrode

A negative electrode was obtained in the same manner as Example 1, except that the first active material, Super C65 as a conductive material, styrene butadiene rubber (SBR) as a first binder polymer and carboxymethyl cellulose (CMC) as a thickener were mixed at a weight ratio of 95.7:1:2.3:1, and water was added thereto to prepare slurry for a lower layer, and the second active material, Super C65 as a conductive material, styrene butadiene rubber (SBR) as a second binder polymer and carboxymethyl cellulose (CMC) as a thickener were mixed at a weight ratio of 96.3:1:1.7:1, and water was added thereto to prepare slurry for an upper layer.

Comparative Example 1: Manufacture of Negative Electrode

An active material including secondary particles of artificial graphite formed by granulation of primary particles of artificial graphite and a carbon coating layer disposed on the artificial graphite was prepared. Herein, in the active material, the primary particles had an average particle diameter (D50) of 10 μm, and the secondary particles formed by granulation of the primary particles had an average particle diameter (D50) of 20 μm. The carbon coating layer was present on the secondary particles in an amount of 4.0 wt % based on the total weight of the second active material. Herein, the secondary particles having the carbon coating layer thereon had an average particle diameter (D50) of 21 μm.

The active material, Super C65 as a conductive material, styrene butadiene rubber (SBR) as a binder polymer and carboxymethyl cellulose (CMC) as a thickener were mixed at a weight ratio of 96:1:2:1, and water was added thereto to prepare slurry.

The slurry was applied to one surface of copper (Cu) foil as a negative electrode current collector having a thickness of 10 μm at a loading amount of 5 mAh/cm$^2$. After coating the slurry, the slurry was dried at 80° C. for 20 minutes to remove water in the slurry, the dried slurry layer is pressed, and then vacuum drying was carried out at about 130° C. for 8 hours to obtain a negative electrode. Herein, the resultant negative electrode had a porosity of 30%.

The obtained negative electrode had a single layer structure of negative electrode active material layer having a total thickness of 100 μm.

Comparative Example 2: Manufacture of Negative Electrode

Primary particles of artificial graphite having an average particle diameter (D50) of 10 μm were used as an active material.

The active material, Super C65 as a conductive material, styrene butadiene rubber (SBR) as a binder polymer and carboxymethyl cellulose (CMC) as a thickener were mixed at a weight ratio of 96:1:2:1, and water was added thereto to prepare slurry.

The slurry was applied to one surface of copper (Cu) foil as a negative electrode current collector having a thickness of 10 μm at a loading amount of 5 mAh/cm$^2$. After coating the slurry, the slurry was dried at 80° C. for 20 minutes to remove water in the slurry, the dried slurry layer is pressed, and then vacuum drying was carried out at about 130° C. for 8 hours to obtain a negative electrode. Herein, the resultant negative electrode had a porosity of 30%.

The obtained negative electrode had a single layer structure of negative electrode active material layer having a total thickness of 100 μm.

Comparative Example 3: Manufacture of Negative Electrode

A negative electrode was obtained in the same manner as Example 1, except that the first active material, Super C65 as a conductive material, styrene butadiene rubber (SBR) as a first binder polymer and carboxymethyl cellulose (CMC) as a thickener were mixed at a weight ratio of 96:1:2:1, and water was added thereto to prepare slurry for a lower layer, and the second active material, Super C65 as a conductive material, styrene butadiene rubber (SBR) as a second binder polymer and carboxymethyl cellulose (CMC) as a thickener were mixed at a weight ratio of 96:1:2:1, and water was added thereto to prepare slurry for an upper layer.

Comparative Example 4: Manufacture of Negative Electrode

A negative electrode was obtained in the same manner as Example 1, except that the second active material was not provided with a carbon coating layer.

Comparative Example 5: Manufacture of Negative Electrode

A negative electrode was obtained in the same manner as Example 1, except that the first active material was provided with a carbon coating layer.

Herein, the carbon coating layer was present in an amount of 4.0 wt % based on the total weight of the first active material.

Comparative Example 6: Manufacture of Negative Electrode

A negative electrode was obtained in the same manner as Example 1, except that the slurry for an upper layer according to Example 1 was used as slurry for a lower layer, and the slurry for a lower layer according to Example 1 was used as slurry for an upper layer.

Comparative Example 7: Manufacture of Negative Electrode

Secondary particles of artificial graphite (including no carbon coating layer) formed by granulation of primary particles of artificial graphite were prepared as a first active material. Herein, in the first active material, the primary particles had an average particle diameter (D50) of 10 μm, and the secondary particles formed by granulation of the primary particles had an average particle diameter (D50) of 20 μm.

The first active material, Super C65 as a conductive material, styrene butadiene rubber (SBR) as a first binder polymer and carboxymethyl cellulose (CMC) as a thickener were mixed at a weight ratio of 95:1:3:1, and water was added thereto to prepare slurry for a lower layer.

A negative electrode was obtained in the same manner as Example 1, except that the prepared slurry for a lower layer was used.

Evaluation of Characteristics of Negative Electrode/Secondary Battery

Test Example 1: Evaluation of Quick Charging Performance of Battery

Lithium (Li) metal foil cut into a circular shape having an area of 1.7671 cm² was used as a positive electrode. A porous separator made of polyethylene was interposed between the positive electrode and the negative electrode (each of the negative electrodes according to Examples 1-3 and Comparative Examples 1-7), and an electrolyte prepared by dissolving vinylene carbonate and 1 M LiPF$_6$ in a mixed solution containing methyl ethyl carbonate (EMC) and ethylene carbonate (EC) at a mixing volume ratio of 7:3 was injected thereto to obtain a lithium coin half-cell.

Each half-cell was charged in a constant current (CC)/constant voltage (CV) mode (current rate 0.1 C, 5 mV, 0.005 C current cut-off) and discharged in a CC mode to 1.0 V for the initial three cycles. Each half-cell was charged at a current rate of 1.5 C in a CC mode to SOC 80%, and the voltage depending on a change in SOC was plotted in the form of a graph based on the discharge capacity at the third cycle. In the graph, X axis represents SOC and Y axis represents the measured output voltage. Then, a gradient change point was found through dV/dQ differentiation to determine a Li plating SOC. In this manner, each battery was evaluated in terms of quick charging performance.

Test Example 2: I(004)/I(110) as Determined by X-Ray Diffractometry

Each of the negative electrodes according to Examples 1-3 and Comparative Examples 1-7 was analyzed by X-ray diffractometry by using an XRD system to determine the peak intensity of each of (004) plane and (110) plane. Then, the ratio of peak intensity of (004) plane to (110) plane, i.e. I(004)/I(110) was calculated.

Test Example 3: Evaluation of Negative Electrode Adhesion

Each of the negative electrodes according to Examples 1-3 and Comparative Examples 1-7 was evaluated in terms of negative electrode adhesion as follows. The results are shown in the following Table 2.

Each negative electrode was cut into a size of 20 mm×150 mm and fixed with a tape at the central portion of slide glass having a size of 25 mm×75 mm. Then, a universal testing machine (UTM) was used to determine the 90° peel strength, while peeling the current collector. The test result is shown as an average value of 5 measurements of peel strength.

TABLE 2

|  | Evaluation of quick charging performance of battery 1.5 C Li plating SOC (%) | I(004)/I(110) as determined by X-ray diffractometry | Negative electrode adhesion (gf/10 mm) |
| --- | --- | --- | --- |
| Ex. 1 | No deposition | 10 | 40 |
| Ex. 2 | No deposition | 10 | 36 |
| Ex. 3 | No deposition | 10 | 31 |
| Comp. Ex. 1 | SOC 70 | 10 | 10 |
| Comp. Ex. 2 | SOC 40 | 35 | 28 |
| Comp. Ex. 3 | SOC 70 | 10 | 28 |
| Comp. Ex. 4 | SOC 50 | 10 | 40 |
| Comp. Ex. 5 | SOC 70 | 10 | 40 |
| Comp. Ex. 6 | SOC 36 | 35 | 7 |
| Comp. Ex. 7 | No deposition | 10 | 12 |

Referring to Table 2, in the case of the negative electrode according to each of Examples 1-3, it can be seen that primary particles having high adhesion are present in the lower layer region, secondary particles of artificial graphite provided with a carbon coating layer and having excellent quick charging performance are present in the upper layer region, a higher content of binder polymer is present in the lower layer region so that each negative electrode may show excellent adhesion, and a lower content of binder polymer is present in the upper layer region so that each negative electrode may provide excellent quick charging performance. Meanwhile, in the case of the negative electrode according to Comparative Example 1, it has a single layer structure including secondary particles of artificial graphite provided with a carbon coating layer to provide significantly low adhesion. In addition, a higher content of binder polymer is present in the upper layer region of the negative electrode according to Comparative Example 1, as compared to the content of the binder polymer in the upper layer region of the negative electrode according to Example 1, and thus quick charging performance is degraded significantly.

In the case of the negative electrode according to Comparative Example 2, it has a single layer structure including primary particles of artificial graphite, and a lower content of binder polymer is present in the lower layer region of the negative electrode according to Comparative Example 2, as compared to the content of the binder polymer in the lower layer region of the negative electrode according to each of Examples 1-3, and thus adhesion is reduced, and quick charging performance is degraded significantly due to a high degree of orientation.

In the case of the negative electrode according to Comparative Example 3, even though it uses the same active materials as Example 1 in the lower layer region and the upper layer region, the same content of the binder polymer is used for the lower layer region and the upper layer region to cause a decrease in adhesion and degradation of quick charging performance, as compared to the negative electrode according to Example 1.

In the case of the negative electrode according to Comparative Example 4, unlike the negative electrode according to Example 1, the secondary particles in the upper layer region are not provided with a carbon coating layer to cause degradation of quick charging performance.

In the case of the negative electrode according to Comparative Example 5, unlike the negative electrode according to Example 1, the primary particles used in the lower layer region are provided with a carbon coating layer, and thus the primary particles provided with the carbon coating layer have hard properties. When using the active material provided with a carbon coating layer in both the upper layer region and the lower layer region, pores cannot be formed well in the upper layer region to cause an increase in electrolyte diffusion resistance, resulting in degradation of quick charging performance.

In the case of the negative electrode according to Comparative Example 6, the upper layer region and the lower layer region are reversed, as compared to the negative electrode according to Example 1. Thus, it can be seen that the negative electrode according to Comparative Example 6 shows a decrease in adhesion and degradation of quick charging performance.

In the case of the negative electrode according to Comparative Example 7, secondary particles of artificial graphite are used in the lower layer region instead of primary particles of artificial graphite, unlike the negative electrode according to Example 1. It can be seen that the negative electrode according to Comparative Example 7 shows partially improved quick charging performance, but causes a significant decrease in adhesion, and thus cannot be used actually.

What is claimed is:

1. A negative electrode, comprising:
a negative electrode current collector; and
a negative electrode active material layer disposed on at least one surface of the negative electrode current collector, the negative electrode active material layer having:
  a lower layer region containing:
    a first active material comprising primary particles of artificial graphite, and
    a first binder polymer, and
  an upper layer region disposed on the lower layer region and containing:
    a second active material comprising secondary particles of artificial graphite and a carbon coating layer disposed on the secondary particles, and
    a second binder polymer,
  wherein a weight percentage (wt %) of the first binder polymer in the lower layer region is larger than a weight percentage (wt %) of the second binder polymer in the upper layer region.

2. The negative electrode according to claim 1, wherein the first active material has a D50 of 3-20 μm.

3. The negative electrode according to claim 1, wherein the second active material has a D50 of 5-35 μm.

4. The negative electrode according to claim 1, wherein the secondary particles of artificial graphite include aggregated primary particles of artificial graphite.

5. The negative electrode according to claim 1, wherein the carbon coating layer of the second active material is present in an amount of 0.5-10.0 wt % based on a total weight of the second active material.

6. The negative electrode according to claim 1, wherein a ratio of the weight percentage (wt %) of the first binder polymer in the lower layer region to the weight percentage (wt %) of the second binder polymer in the upper layer region is 1.1:1-5:1.

7. The negative electrode according to claim 1, wherein the weight percentage (wt %) of the first binder polymer in the lower layer region of the negative electrode active material layer is 2-4 wt %, and the weight percentage (wt %) of the second binder polymer in the upper layer region of the negative electrode active material layer is 0.5-2 wt %.

8. The negative electrode according to claim 1, wherein a ratio (wt %) of a combined weight of the first binder polymer and the second binder polymer based on a total weight of the negative electrode active material layer is 1-3 wt %.

9. A method for manufacturing a negative electrode, comprising:
preparing a first slurry for a lower layer containing:
  a first active material comprising primary particles of artificial graphite,
  a first binder polymer, and
  a first dispersion medium;
preparing a second slurry for an upper layer containing:
  a second active material comprising secondary particles of artificial graphite and a carbon coating layer disposed on the secondary particles,
  a second binder polymer, and
  a second dispersion medium;
applying the first slurry on one surface of a negative electrode current collector;
applying the second slurry on the applied first slurry; and drying the applied first and second slurries at the same time to form a negative electrode active material layer, wherein a weight percentage (wt %) of the first binder polymer in a solid content of the first slurry is larger than a weight percentage (wt %) of the second binder polymer in a solid content of the second slurry.

10. The method for manufacturing a negative electrode according to claim 9, wherein a ratio of the weight percentage (wt %) of the first binder polymer in the solid content of the first slurry to the weight percentage (wt %) of the second binder polymer in the solid content of the second slurry is 1.1:1-5:1.

11. The method for manufacturing a negative electrode according to claim 9, wherein:

the weight percentage (wt %) of the first binder polymer in the solid content of the first slurry is 2-4 wt %, and the weight percentage (wt %) of the second binder polymer in the solid content of the second slurry is 0.5-2 wt %.

12. The method for manufacturing a negative electrode according to claim 9, wherein a ratio (wt %) of a combined weight of the first binder polymer and the second binder polymer based on a total solid content of the first and second slurries is 1-3 wt %.

13. A lithium secondary battery comprising the negative electrode as defined in claim 1.

* * * * *